US008814745B2

(12) United States Patent
Lundrigan (10) Patent No.: US 8,814,745 B2
(45) Date of Patent: Aug. 26, 2014

(54) DYNAMIC BRAKE FOR A WINCH

(76) Inventor: Brian Lundrigan, Conception Bay South (CA)

( * ) Notice: Subject to any disclaimer, the term of this patent is extended or adjusted under 35 U.S.C. 154(b) by 221 days.

(21) Appl. No.: 13/507,511

(22) Filed: Jul. 6, 2012

(65) Prior Publication Data

US 2014/0011627 A1    Jan. 9, 2014

(51) Int. Cl.
*F16H 35/02*    (2006.01)
*F16H 37/12*    (2006.01)
*F16H 3/44*    (2006.01)

(52) U.S. Cl.
USPC ............. 475/312; 475/17; 475/311; 475/300

(58) Field of Classification Search
USPC ..................... 475/17, 300, 311, 312; 192/223
See application file for complete search history.

(56) References Cited

U.S. PATENT DOCUMENTS

| 2,181,359 | A |   | 11/1939 | Barrett |   |
|---|---|---|---|---|---|
| 2,590,610 | A |   | 3/1952 | Grosch |   |
| 2,649,281 | A |   | 9/1953 | Hastings, Jr. |   |
| 3,109,525 | A |   | 11/1963 | Welch |   |
| 3,572,638 | A |   | 3/1971 | Tatsuguchi |   |
| 4,328,954 | A |   | 5/1982 | Logus |   |
| 4,666,172 | A | * | 5/1987 | Hartmann | ...................... 280/238 |
| 5,558,293 | A | * | 9/1996 | Hirase et al. | ................... 242/372 |
| RE36,216 | E |   | 6/1999 | Telford |   |
| 6,010,426 | A | * | 1/2000 | Nakamura | ....................... 477/22 |
| 8,579,756 | B2 | * | 11/2013 | Oki | ............................... 475/300 |

FOREIGN PATENT DOCUMENTS

| CA | 423908 | 11/1944 |
|---|---|---|
| CA | 833397 | 2/1970 |
| CA | 1081204 | 7/1980 |
| GB | 1080034 a1 * | 8/1967 |

* cited by examiner

*Primary Examiner* — Tisha Lewis
(74) *Attorney, Agent, or Firm* — Mario Theriault (57) ABSTRACT

The brake system includes a sun gear fixedly mounted to an input shaft. The sun gear is mounted inside a planetary chassis between two pinion gears. The sun gear has teeth protruding from its circumference on both sides thereof. The teeth are aligned in such a way that when the sun gear is turned to a neutral position, the teeth are engaged with the pinion gears, preventing a rotation of the pinion gears, and when the sun gear is rotated away from the neutral position, the teeth are disengaged from the pinion gears allowing the pinion gears to rotate. When no torque is applied to the input shaft, the sun gear is urged back to its neutral position. In a second embodiment, the sun gear is urged in a drag mode against the trailing side of the teeth on the pinion gears, for producing a pawl-and-latch noise during use.

20 Claims, 5 Drawing Sheets

DYNAMIC BRAKE FOR A WINCH

FIELD OF THE INVENTION

The present invention pertains to winches and more particularly, it pertains to fail-safe brakes for winches.

BACKGROUND OF THE INVENTION

Because of the consequences of a malfunction of a cable hoist or a winch, there is always a need for improvement in these devices. Various mechanisms have been used in the past to prevent a reverse rotation of a winch drum in use. However, it is believed that the brake systems in the prior art are subject to wear and deterioration from extended use and from aging of its components.

Examples of common brakes on winch drums are described in the following documents.

U.S. Pat. No. 2,181,359 issued on Nov. 28, 1939 to A. M. Barrett, discloses a hoist with a mechanism to slow down the descent of a load on the hoist cable. This braking mechanism is made of a friction brake pad mounted inside a brake drum.

U.S. Pat. No. 2,590,610 issued to G. S. Grosch on Mar. 25, 1952, discloses a braking mechanism for a winch including pawls coacting with a sun wheel mounted in a planetary gear system.

U.S. Pat. No. 2,649,281 issued to R. Hastings, Jr. on Aug. 18, 1953, discloses a winch including a pawl which engages the teeth of a stationary cylinder for braking the rotation of the drum in a reverse direction.

U.S. Pat. No. 3,109,525 issued to A. L. Welch on Nov. 5, 1963, discloses a winch including a brake band surrounding a ring gear to prevent the cable drum from rotating backwards.

U.S. Pat. No. 3,572,638 issued on Mar. 30, 1971 to M. T. Funabashi, discloses a winch and a brake. This braking mechanism comprises three pawls engaging with a ring gear. The pawls are operated by cams and springs to prevent reverse rotation of the winch drum. A pair of levers are used to disengage the pawls and to allow free rotation of the winch drum.

U.S. Pat. No. 4,328,954 issued to A. T. Logus on May 11, 1982, discloses another winch including a fail-safe disc-type friction brake.

U.S. Re 36,216 issued to T. M. Telford on Jun. 1, 1999, discloses a winch with an automated brake including cone-shaped brake shoes mounted on the driving shaft to cause a braking action to the drum.

Winches and hoists are often subjected to stresses beyond their safety ratings. Winches and hoists are used in all kind of weather conditions and can be stored away for long periods of time between uses. Therefore, in addition to failure in use from excessive strain, these equipments are susceptible of failure by aging of their components.

Although the winches and hoists of the prior art deserve undeniable merits, there is a need in this field for a winch brake that has few moving parts; that is not subject to wear or to aging, and that does not require periodic adjustment.

SUMMARY OF THE INVENTION

In the brake systems according to the present invention, however, there are few moving parts. A positive drum-locking arrangement is provided to prevent a rotation of the winch drum whenever there is no torque applied to the input shaft of the winch.

In a first aspect of the present invention, there is provided a brake system for a planetary gear assembly. The planetary gear assembly referenced herein has a ring gear; an input shaft mounted coaxially with the ring gear; a pair of pinion gears mounted in a planetary chassis rotating about the input shaft. The brake system includes a sun gear fixedly mounted to the input shaft inside the planetary chassis, between the pinion gears. The sun gear is mounted inline with the centres of the pinion gears. The sun gear has teeth protruding from its circumference surfaces on both sides thereof, diametrically opposite from each other. The circumference surfaces on the sun gear near the teeth are diametrically spaced a smaller distance than a spacing between the pinion gears. The teeth are aligned in such a way that when the sun gear is turned to a neutral position, the teeth are engaged with the pinion gears, preventing a rotation of the pinion gears, and when the sun gear is rotated away from the neutral position, the teeth are disengaged from the pinion gears, allowing the pinion gears and the planetary chassis to rotate. The sun gear has a finger extending radially therefrom. The planetary chassis has a stopper therein for engaging with the finger and for holding the finger and for preventing rotation of the sun gear when the teeth are disengaged from the pinion gears. The stopping of the finger is also used for transmitting a torque from the input shaft to the planetary chassis and to the pinion gears.

In another aspect of the present invention, there is provided a gearing-and-brake system. This combination includes the brake system described above and a movable ring gear. In this arrangement, the ring gear included in the brake system firstly described is a stationary ring gear, and the movable ring gear is mounted side-by-side with the stationary ring gear about the input shaft. In this arrangement, the planetary pinion gears are wide enough to engage with both the stationary ring gear and the movable ring gear. The movable ring gear has fewer teeth than the stationary ring gear. In use, the engagement of the finger with the stopper is used for transmitting a torque from the input shaft to the planetary pinion gears and for rotating the movable ring gear relative to the stationary ring gear. The movable ring gear is mounted to the drum of the winch. The torque transmitted from the input shaft is transmitted to the winch drum with a substantial mechanical advantage.

In yet another aspect of the present invention, there is provided a brake system for a planetary gear assembly. The planetary gear assembly referenced herein has a ring gear; an input shaft mounted coaxially with the ring gear; a pair of pinion gears mounted in a planetary chassis rotating about the input shaft. The brake system includes a sun gear movably mounted to the input shaft inside the planetary chassis, between the pinion gears. The sun gear is mounted to the planetary chassis diametrically inline with the centres of the pinion gears. The sun gear has teeth protruding from its circumference surfaces on both sides thereof, diametrically opposite from each other. The circumference surfaces on the sun gear near the teeth are diametrically spaced a smaller distance than a spacing between the pinion gears. The teeth are aligned in such a way that when the sun gear is turned to a neutral position, the teeth are engaged with the pinion gears, preventing a rotation of the pinion gears, and when the sun gear is rotated away from the neutral position, the teeth are disengaged from the pinion gears, allowing the pinion gears and the planetary chassis to rotate.

The sun gear has at least one pair of spring seats thereon, facing opposite directions. The planetary chassis has a pair of torsion springs mounted thereto and acting in opposite directions against the spring seats, for resiliently retaining the sun gear in its neutral position.

The planetary chassis is keyed to the input shaft and rotates with the input shaft. A rotation of the input shaft forces the pinion gears to rotate and to push the sun gear out of its neutral position for allowing the operation of the winch.

In use, the torsion springs urge the sun gear against the trailing side of the pinion gears to produce a pawl-and-latch noise. This audible sign is advantageous for reassuring a user of the proper operation of the brake system.

The word "dynamic" is used herein to designate a brake that is connected directly to the input shaft of the winch and wherein a locking of the winch occurs immediately upon a release of any torque on the input shaft in either direction of rotation of that shaft. The brake is also immediately applied when the torque on the input shaft is insufficient to overcome the torque applied to the winch drum by the load. In other words, the brake is associated in a most direct manner to the torque on the input shaft.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Two embodiments of a dynamic brake system for a winch are illustrated in the attached drawings. In these drawings the same numerals are used to identify the same elements. In the drawings.

DETAILED DESCRIPTION OF THE PREFERRED EMBODIMENTS

While this invention is susceptible of embodiment in many different forms, there are shown in the drawings and will be described in details herein two specific embodiments of a dynamic brake for a winch. It should be understood that the present disclosure is to be considered as examples of the principles of the invention and is not intended to limit the invention to the embodiments illustrated and described.

Figure 1:
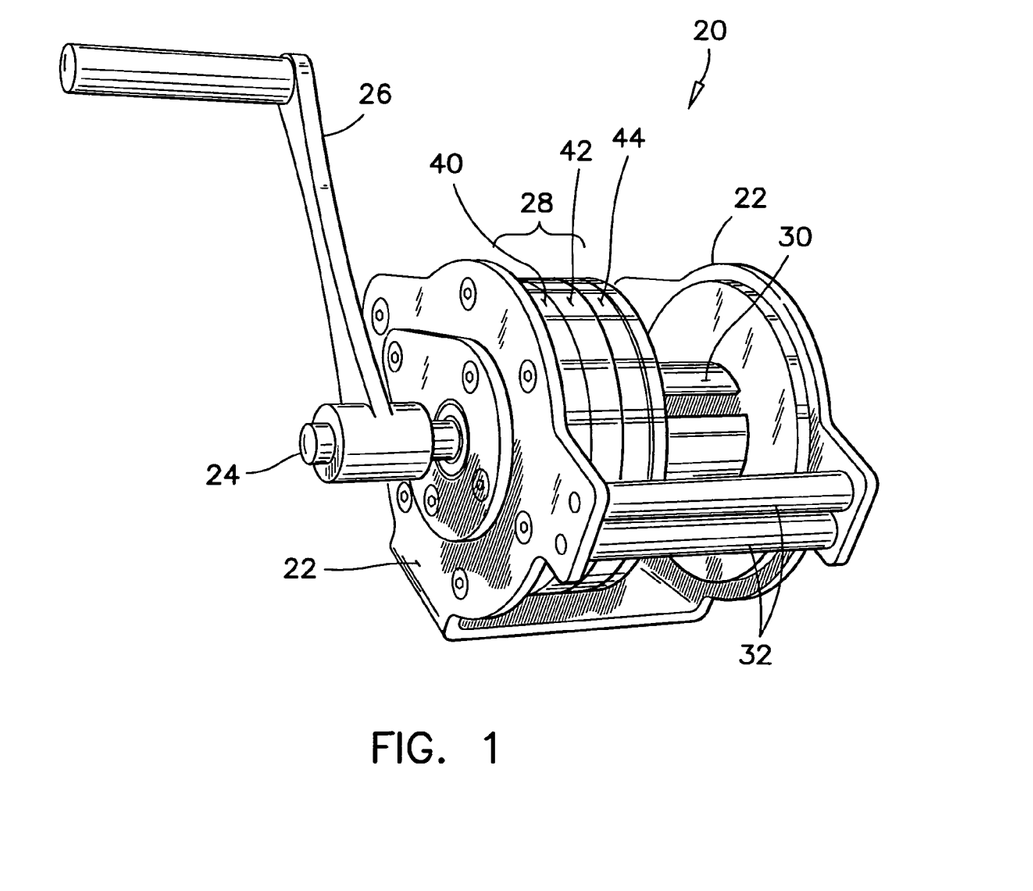
FIG. 1 illustrates a perspective view of a winch with a brake assembly according to the first preferred embodiment of the present invention.

Referring firstly to FIG. 1, the winch 20 with a brake according to the first preferred embodiment of the present invention has a winch body 22; an input shaft 24; a handle 26 mounted to the input shaft 24, a differential gear box 28 and a winch drum 30, on which a cable or a belt (not shown) is wound. The winch body 22 has a pair of guide rollers 32 on one side thereof in front of the drum 30, between which the cable or belt is guided to the drum 30. Still in FIG. 1, there can be seen the differential gear box 28 having a gearbox housing 40, a stationary ring gear 42 and a drum-drive ring gear 44.

Although a handle 26 is shown in FIG. 1, it will be appreciated that an electric motor; a pulley; a sprocket or a gearbox may be used to apply torque on the input shaft 24. Therefore, the winch with a dynamic brake 20 described herein is not limited to manual winches.

The gearbox housing 40 and the stationary ring gear 42 are fixed to the winch body 22, and the drum-drive, or movable ring gear 44 is affixed to the winch drum 30 and causes the winch drum 30 to rotate. The winch drum 30 is free to rotate about the input shaft 24.

Figure 2:
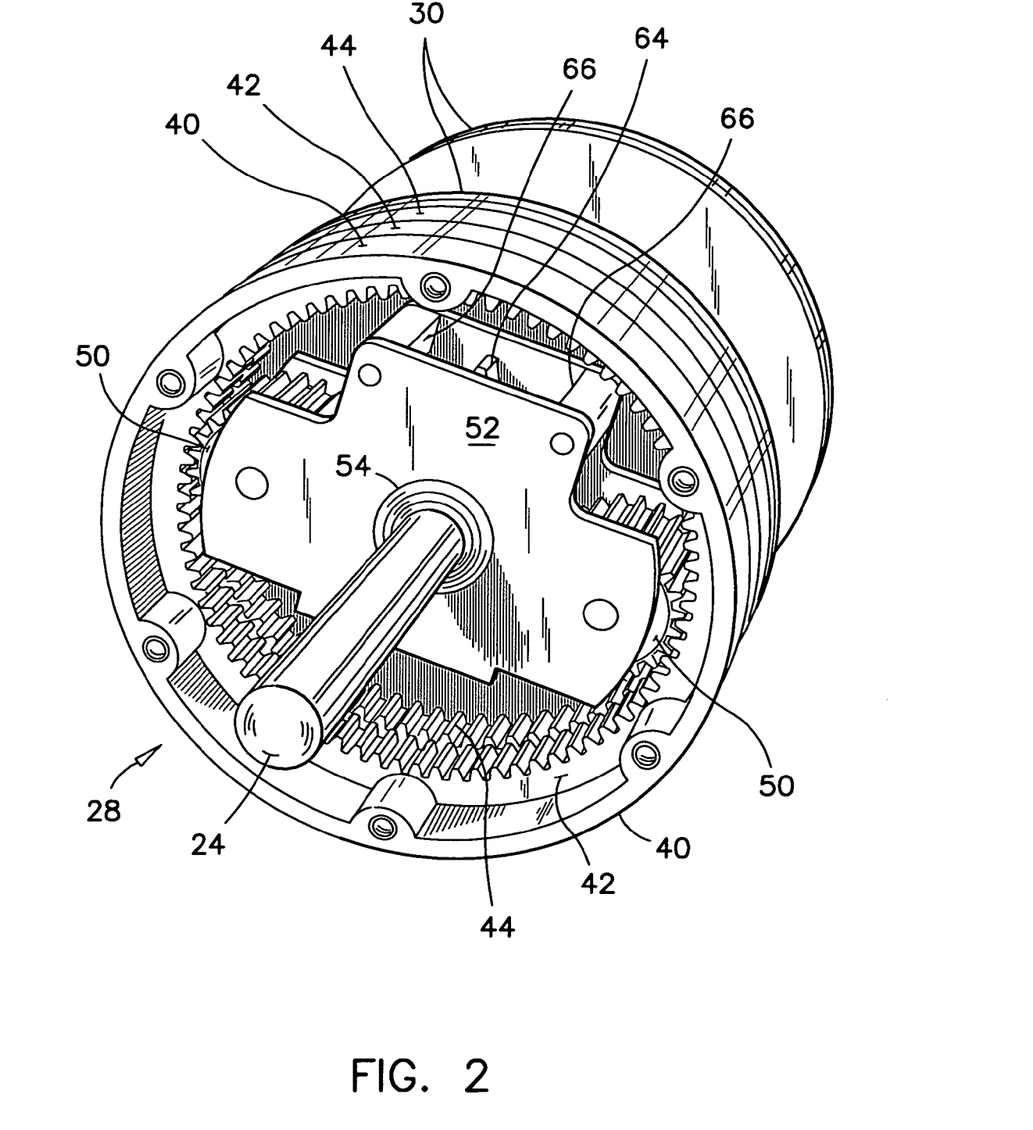
FIG. 2 is a perspective view of a winch with the cover plate and handle removed to show the first preferred dynamic brake mechanism.

Referring now to FIG. 2, the differential gear box 28 will be described. As it will be understood, the gearbox housing 40 is bolted to the winch body 22 in use. The winch body 22 has been removed in FIG. 2 for clarity. Therefore, the gearbox housing 40 is considered to be stationary in FIG. 2.

The stationary ring gear 42 is also stationary as it is affixed to the gearbox housing 40. The drum-drive, or movable ring gear 44 is mounted next to the stationary ring gear 42. A pair of planetary pinion gears 50 are mounted to a planetary chassis 52. The planetary chassis 52 is mounted on bearings on the input shaft 24. One of these bearings is labelled 54 in FIG. 2. The planetary chassis 52 is free to rotate about the input shaft 24. Each planetary pinion gear 50 has a width that is twice as much as the stationary ring gear 42 so as to engage with both the stationary ring gear 42 and the drum-drive ring gear 44.

The drum-drive ring gear 44 has a differing number of teeth that the stationary ring gear 42, and the pitch of these teeth allows for the engagement of the planetary pinion gears 50 with both ring gears 42, 44. Because of the difference in the number of teeth in both ring gears 42, 44, and because of the planetary pinion gears 50 engaging both ring gears 42, 44, a rotation of the planetary chassis 52 and of the planetary pinion gears 50 causes the drum-drive ring gear 44 to rotate relative to the stationary ring gear 42, with a significant mechanical advantage.

Figure 3:
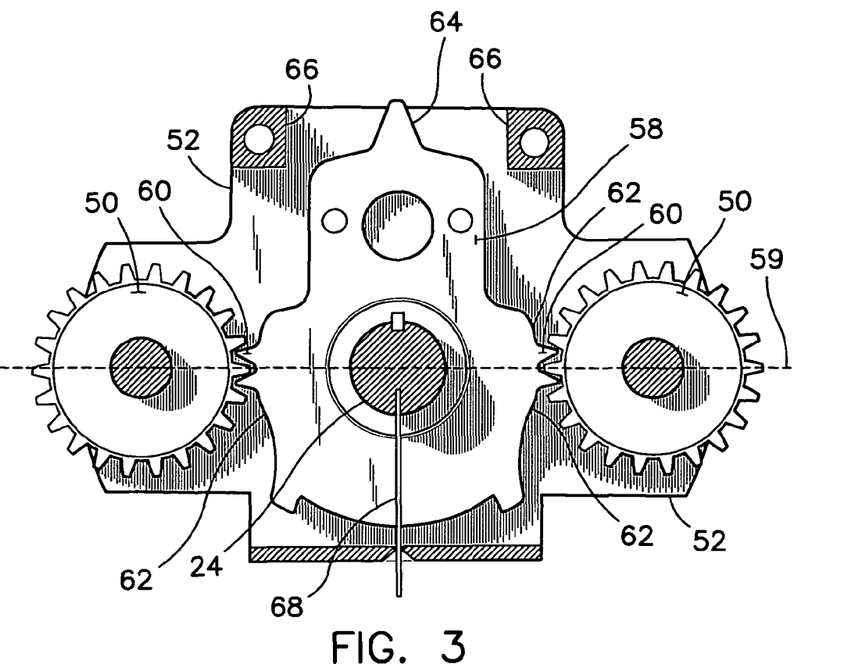
FIG. 3 is a first partial elevation view of the dynamic brake mechanism according to the first preferred embodiment, shown in a "locked-drum" position.
Figure 4:
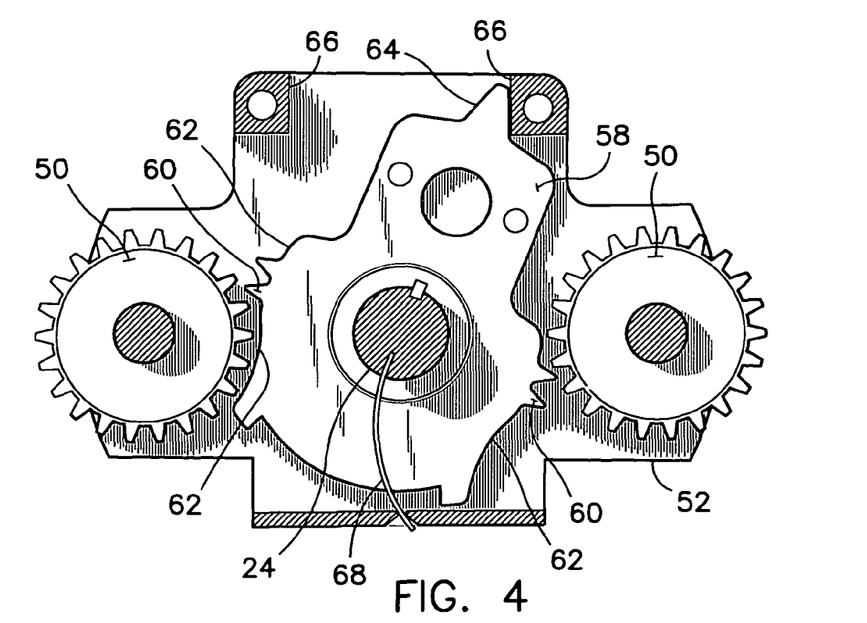
FIG. 4 is a second partial elevation view of the dynamic brake mechanism according to the first preferred embodiment, shown in an "unlatched" position.

Referring now to FIGS. 2, 3 and 4 simultaneously, the operation of the dynamic brake according to the first preferred embodiment of the present invention will be explained. In FIGS. 3 and 4, in particular, the wall of the planetary chassis 52 closest to the viewer has been removed to show the sun gear 58 inside the planetary chassis 52. The sun gear 58 is also referred to herein as the sun gear dial 58 to distinguish it from its equivalent in the second preferred embodiment of the present invention, to be described later. The sun gear dial 58 is keyed to the input shaft 24, and rotates with the input shaft 24.

The input shaft 24, the sun gear dial 58 and the planetary pinion gears 50. are inline with each other, along line 59 in FIG. 3 more specifically. The sun gear dial 58 has locking gear teeth 60 protruding from its circumference surfaces 62, diametrically opposite from each other. The circumference surfaces 62 of the sun gear dial 58 near the teeth 60 are diametrically spaced a distance that is smaller than a spacing between the pinion gears 50. When the sun gear dial 58 is in a neutral position as shown in FIG. 3, with no torque on the input shaft 24, the locking gear teeth 60 on the sun gear dial 58 engage with both planetary pinion gears 50 and prevent a rotation of the planetary pinion gears 50, thereby preventing a rotation of the winch drum 30. This neutral position is referred to as the locked-drum position.

When the sun gear dial 58 is rotated to either side from its neutral position, such as shown in FIG. 4, the locking gear teeth 60 are moved away from their engagement with the planetary pinion gears 50, thereby allowing the planetary pinion gears 50 to rotate.

The sun gear dial 58 has a finger 64 along a radius thereof, at a right angle with the alignment of the locking gear teeth 60. This finger extends between two stoppers 66 on the planetary chassis 52. When the sun gear dial 58 is rotated in either direction, through the handle 26 and the input shaft 24, the finger 64 on the sun gear dial 58 abuts against one of the stoppers 66. The finger 64 pushing against the stopper 66 causes the planetary chassis 52 to rotate. Of course, the rotation of the planetary chassis 52 causes the planetary pinion gears 50 to rotate in the direction of the torque, thereby turning the winch drum 30.

A leaf spring 68 or any other device to achieve the same result, is provided on the sun gear dial 58 or on the input shaft 24 as shown, to bring back the sun gear dial 58 into its neutral position when no torque is applied to the shaft 24.

Because of the large mechanical advantage obtained from the pair of ring gears 42, 44, and because of the nature of this gearing system, a torque on the winch drum 30 from a load cannot rotate the planetary pinion gears 50 backward and cause the locking gear teeth 60 to creep out of engagement from the planetary pinion gears 50. However, for more certainty, the leaf spring 68 provides a sufficient force between the sun gear dial 58 and the planetary chassis 52, to further retain the sun gear dial 58 in its locked-drum or neutral position.

Figure 5:
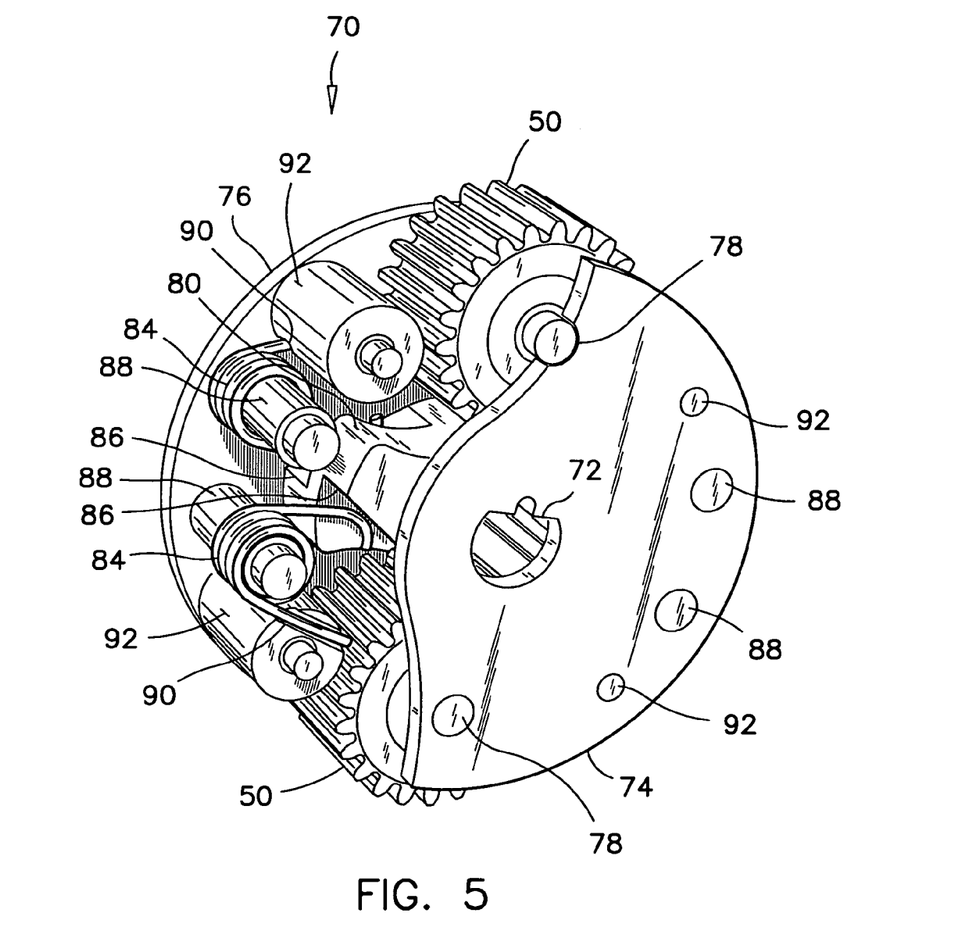
FIG. 5 is a perspective view of the second preferred dynamic brake mechanism with the cover plate partly cut away to show the internal components thereof.
Figure 6:
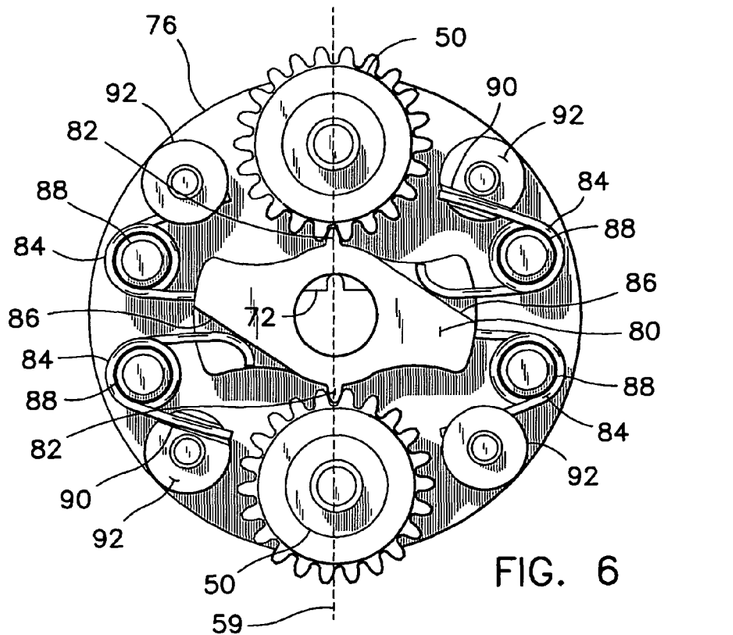
FIG. 6 is a first partial elevation view of the dynamic brake mechanism according to the second preferred embodiment, shown in a "locked-drum" position.
Figure 7:
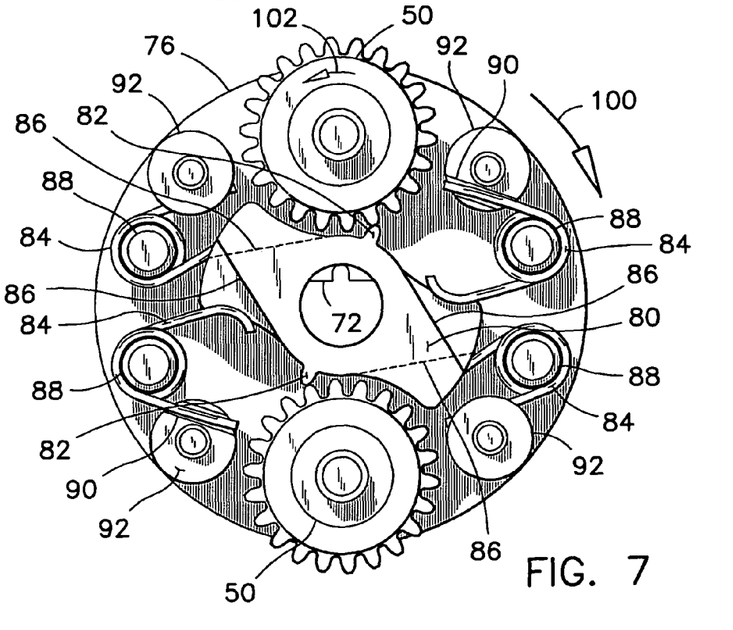
FIG. 7 is a second partial elevation view of the dynamic brake mechanism according to the second preferred embodiment, shown in an "unlatched" position.

Referring now to FIGS. 5, 6 and 7, the brake system according to the second preferred embodiment of the present invention will be described. In the second preferred embodiment, the entire brake mechanism 70 is keyed to the input shaft 24, by way of D-shaped openings 72 in the cover plates 74, 76 of the brake mechanism 70. In this embodiment, the input shaft 24 is modified to engage into the D-shaped openings 72.

A pair of planetary pinion gears 50 are mounted to respective axles 78 that are retained to the cover plates 74, 76. The rotation of the cover plates 74, 76 causes the planetary pinion gears 50 to rotate with the cover plates 74, 76, and to drive the winch drum 30.

As in the previous embodiment, the planetary pinion gears 50 rotate inside the stationary ring gear 42 and the drum-drive ring gear 44 to rotate the winch drum 30 with a substantial mechanical advantage.

In this second preferred embodiment, the sun gear dial mentioned before is replaced by a tilting block 80 which is referred to herein as the sun gear block 80. The sun gear block 80 has diametrically opposite locking teeth 82. The sun gear block 80 is mounted to the input shaft 24 with a free sliding fit, and is free to rotate about the input shaft 24. The sun gear block 80 is held in a locking position, with the locking teeth 82 engaged with the planetary pinion gears 50, by four torsion springs 84. The torsion springs 84 are acting against four spring seats 86 on the sun gear block 80. Two of these spring seats 86 are shown in dashed lines in FIG. 7, for being on the hidden side of the sun gear block 80.

Both the sun gear dial 58 and the sun gear block 80 are also referred to herein as the sun gear, for being mounted at the centre of the planetary gear system and for having a common function of preventing the rotation of the planetary pinion gears 50.

Although four torsion springs 84 are illustrated, it will be appreciated that a single pair of torsion springs 84 acting in opposite directions are sufficient in most applications to move the sun gear 80 to its neutral position.

The operation of the sun gear block 80 is substantially the same as for the sun gear dial 58 described herein before. The teeth in both sun gears 58, 80, are diametrically opposite relative to the input shaft 24 and are movable to be diametrically inline with a line 59 defined by the axes of the planetary pinion gears 50, so as to engage with the teeth of the planetary pinion gears 50; to lock the position of the pinion gears 50 and to brake the winch drum 30.

The teeth on both sun gears 58, 80 are also movable away from the teeth of the pinion gears 50 to allow a rotation of the pinion gears 50 and to allow the rotation of the winch drum 30.

The torsion springs 84 are respectively mounted on four posts 88 extending between both cover plates 74, 76. The fixed ends of the torsion springs 84 are held in grooves 90 on the end of respective spacers 92. The fixed ends of the torsion springs 84 are held between one of the cover plates 74, 76 and aforesaid grooves 90.

Referring now to FIG. 7, the operation of the dynamic brake 70 according to the second preferred embodiment will be explained.

In use, when a torque is applied to the cover plates 74, 76 by the input shaft 24, in the direction of arrow 100 for example, this torque causes the planetary pinion gears 50 to rotate in the opposite direction, in the direction of arrow 102.

The rotation of the planetary pinion gears 50 in the direction of arrow 102 causes the tilting of the sun gear block 80 about the input shaft 24, substantially as shown in FIG. 7. This causes the locking teeth 82 to disengage from their locking positions against the planetary pinion gears 50. The displacement of the locking teeth 82 away from the planetary pinion gears 50 allows the winch drum 30 to rotate as previously explained.

In use, the torsion springs 84 maintain a reverse torque on the sun gear block 80. Because of this reverse torque, the locking teeth 82 are urged against the trailing side of the planetary pinion gears 50 causing a pawl-and-latch noise. The locking teeth 82 drag against each teeth of the planetary pinion gears, snapping against the trailing side of every tooth on the planetary pinion gears 50, producing the pawl-and-latch noise. For most users, this pawl-and-latch noise indicates a proper functioning of the winch. This pawl-and-latch noise at times, may not be present in the brake mechanism according to the first preferred embodiment.

The displacement of the sun gear block 80 from a locking position to a disengaged position is easily done when a torque is applied to the crank handle 26. However, because of the mechanical advantage produced by the planetary pinion gears 50 and the double ring gears 42, 44, a torque on the winch drum 30 cannot overcome the force of the torsion springs 84 and cannot displace the sun gear block 80 from a locking position.

Although FIG. 7 illustrates a movement of the sun gear block 80 in a clockwise direction, the movement of the sun gear block 80 in the other direction is a mirror movement which occurs when the input shaft 24 is rotated in the opposite direction. The position of the torsion springs 84 and the location of the spring seats 86 are mirror images of each other. Therefore, the displacements of the sun gear block 80 to one side or to the other relative to the planetary pinons 50 are mirror movements with mirror actions and a same result.

The operation of the brake system in the second preferred embodiment is the same as in the first preferred embodiment. Both brake systems are connected directly to the input shaft 24 of the winch. The locking of the winch occurs immediately upon a release of any torque on the input shaft 24 in either direction of rotation of that shaft. Both brake systems are also immediately applied when the torque on the input shaft 24 is insufficient to overcome the torque applied to the winch drum by the load.

Equivalents for the components of this winch are possible and therefore the components and arrangements described and illustrated herein should not be considered as limitation to the present invention.

Lastly, a pawl and latch mechanism may be provided to disengage the brake mechanism 28 or 70 from the winch drum 30, to allow a free rotation of the winch drum 30 if required This optional mechanism has not been illustrated because it is not the focus of the present invention.

What is claimed is:

1. A brake system for a planetary gear assembly having; a ring gear; an input shaft mounted inside said ring gear; a planetary chassis pivotally mounted about said input shaft and a pair of pinion gears mounted to said planetary chassis;

said brake system comprising a sun gear fixedly mounted to said input shaft inside said planetary chassis between said pinion gears; said sun gear being mounted inline with centres of said pinion gears; said sun gear having teeth protruding from its circumference surfaces on both sides thereof diametrically opposite from each other; said circumference surfaces near said teeth being diametrically spaced a smaller distance than a spacing between said pinion gears; said teeth being aligned in such a way that when the sun gear is in a neutral position, said teeth are engaged with said pinion gears preventing a rotation of said pinion gears, and when said sun gear is rotated away from said neutral position, said teeth are disengaged from said pinion gears, allowing said pinion gears and planetary chassis to rotate; said sun gear having a finger extending radially therefrom; said planetary chassis having a stopper therein for engaging with said finger and for holding said finger and for preventing a rotation of said sun gear when said teeth are disengaged from said pinion gears and for transmitting a torque from said input shaft to said planetary chassis and to said pinion gears.

2. The brake system as claimed in claim 1, further comprising a spring mounted between said input shaft and said planetary chassis for urging said sun gear toward said neutral position.

3. The brake system as claimed in claim 1, further comprising a second ring gear mounted side-by-side with said first ring gear; said pinion gears being engaged with both said first and second ring gears.

4. The brake system as claimed in claim 3, further comprising a housing and a winch drum and wherein said first ring gear is mounted to said housing and said second ring gear is mounted to said winch drum; said second ring gear having a differing number of teeth than said first ring gear.

5. A gearing and brake system comprising;
an input shaft;
a fixed ring gear and a movable ring gear mounted side-by-side about said input shaft;
a planetary chassis pivotally mounted to said input shaft; said planetary chassis having two planetary pinion gears mounted therein simultaneously engaging said fixed and said movable ring gears; and a sun gear mounted therein between said planetary pinion gears; said sun gear being mounted inline with centres of said planetary pinion gears; said sun gear having teeth protruding from its circumference surfaces on both sides thereof diametrically opposite from each other;
said circumference surfaces near said teeth being diametrically spaced a smaller distance than a spacing between said planetary pinion gears; said teeth being aligned in such a way that when the sun gear is in a neutral position, said teeth being engaged with said planetary pinion gears preventing a rotation of said planetary pinion gears, and when said sun gear is rotated away from said neutral position, said teeth are disengaged from said planetary pinion gears, allowing said planetary pinion gears to rotate; said sun gear being fixedly mounted to said input shaft and having a finger extending radially therefrom; said planetary chassis having a stopper therein for engaging with said finger and for holding said finger and for preventing a rotation of said sun gear when said teeth are disengaged from said planetary pinion gears, and for transmitting a torque from said input shaft to said planetary chassis and to said planetary pinion gears and for rotating said movable ring gear.

6. The gearing and brake system as claimed in claim 5, wherein said movable ring gear has a differing number of teeth that said fixed ring gear.

7. The gearing and brake system as claimed in claim 5, further comprising a housing and a winch drum, and said fixed ring gear is fixedly mounted to said housing, and said movable ring gear is fixedly mounted to said winch drum.

8. The gearing and brake system as claimed in claim 5, further comprising a spring mounted between said input shaft and said planetary chassis for urging said sun gear toward said neutral position.

9. A brake system for a planetary gear assembly having; a first ring gear; an input shaft mounted inside said ring gear; a planetary chassis mounted to said input shaft for rotation with said input shaft, and a pair of pinion gears mounted inside said planetary chassis; inside said first ring gear and being engaged with said first ring gear; said planetary chassis being keyed to said input shafts for rotation with said input shaft;

said brake system comprising a sun gear movably mounted to said input shaft for movement about said input shaft, inside said planetary chassis between said pinion gears; said sun gear being mounted to said planetary chassis inline with centres of said pinion gears; said sun gear having teeth protruding from its circumference surfaces on both sides thereof diametrically opposite from each other; said circumference surfaces near said teeth being diametrically spaced a smaller distance than a spacing between said pinion gears; said teeth being aligned in such a way that when the sun gear is in a neutral position, said teeth are engaged with said pinion gears preventing a rotation of said pinion gears, and when said sun gear is rotated away from said neutral position, said teeth are disengaged from said pinion gears, allowing said pinion gears and said planetary chassis to rotate; said sun gear having at least a pair of spring seats thereon facing opposite directions; said planetary chassis having at least a pair of torsion springs mounted thereto and acting in opposite directions against said spring seats, for urging said sun gear toward said neutral position.

10. The brake system as claimed in claim 9, further comprising a winch drum and a second ring gear, and wherein said first ring gear is mounted to said housing and said second ring gear is mounted to said winch drum; said second ring gear having a differing number of teeth than said first ring gear, and said planetary pinion gears being simultaneously engaged with both said first and second ring gears.

11. The brake system as claimed in claim 9 wherein said sun gear has at least two spring seats thereon and said planetary chassis has at least one pair of torsion springs acting against said spring seats.

12. The brake system as claimed in claim 9, wherein said planetary chassis is enclosed between two cover plates, and said cover plates are keyed to said input shaft.

13. The brake system as claimed in claim 12, wherein each of said cover plates have a D-shaped central openings, and said input shaft is keyed to said cover plates by way of said D-shaped openings.

14. The brake system as claimed in claim 9, wherein said locking teeth on said sun gear are extending in mirror images of each other.

15. The brake system as claimed in claim 11, wherein said spring seats and said torsion springs are mounted in mirror images of each other.

16. The brake system as claimed in claim 9, wherein said torsion springs are mounted for urging said sun gear against a trailing side of said pinion gears for producing a pawl-and-latch noise.

17. A winch having a housing; an input shaft; a gearing and brake system and a winch drum pivotally mounted to said input shaft; said gearing and brake system comprising;
   a first ring gear affixed to said housing and a second ring gear affixed to said winch drum; said first and second ring gears being mounted side-by-side;
   a planetary chassis pivotally mounted to said input shaft; said planetary chassis having two planetary pinion gears mounted therein, each engaging said first and second ring gears and a sun gear mounted between said planetary pinion gears; said sun gear being mounted inline with centres of said planetary pinion gears; said sun gear having teeth protruding from its circumference surfaces on both sides thereof diametrically opposite from each other; said circumference surfaces near said teeth being diametrically spaced a smaller distance than a spacing between the pinion gears; said teeth being aligned in such a way that when the sun gear is in a neutral position, said teeth are engaged with said planetary pinion gears preventing a rotation of said planetary pinion gears, and when said sun gear is rotated away from said neutral position, said teeth are disengaged from said planetary pinion gears, allowing said planetary pinion gears to rotate; said sun gear being fixedly mounted to said input shaft and having a finger extending radially thereon; said planetary chassis having a stopper therein for engaging with said finger and for holding said finger and preventing rotation of said sun gear when said teeth are disengaged from said planetary pinion gears, and for transmitting a torque from said input shaft to said planetary chassis and said planetary pinion gears and for rotating said winch drum.

18. The winch as claimed in claim 17, wherein said second ring gear has a differing number of teeth that said first ring gear.

19. The winch as claimed in claim 17, further comprising a spring mounted between said sun gear and said planetary chassis for urging said sun gear toward said neutral position.

20. The winch as claimed in claim 17, being a manual winch and further comprising a handle on said input shaft.

* * * * *